United States Patent
Dou

(10) Patent No.: US 9,465,466 B2
(45) Date of Patent: Oct. 11, 2016

(54) METHOD AND APPARATUS FOR SENSING GESTURE TOWARD TOUCH INPUT DEVICE

(71) Applicant: Tencent Technology (Shenzhen) Company Limited, Shenzhen Guangdong (CN)

(72) Inventor: Ningjun Dou, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/494,668

(22) Filed: Sep. 24, 2014

(65) Prior Publication Data
US 2015/0009167 A1    Jan. 8, 2015

Related U.S. Application Data

(63) Continuation of application No. PCT/CN2013/089082, filed on Dec. 11, 2013.

(30) Foreign Application Priority Data

Feb. 28, 2013    (CN) .......................... 2013 1 0066281

(51) Int. Cl.
G06F 3/041    (2006.01)
G06F 3/01    (2006.01)

(52) U.S. Cl.
CPC .............. *G06F 3/041* (2013.01); *G06F 3/017* (2013.01); *G06F 2203/04101* (2013.01)

(58) Field of Classification Search
CPC ....... G06F 3/0488; G06F 3/017; G06F 3/041
See application file for complete search history.

(56) References Cited

U.S. PATENT DOCUMENTS

| | | | |
|---|---|---|---|
| 5,736,687 A | 4/1998 | Sellers | |
| 2010/0214244 A1* | 8/2010 | Kim | G06F 3/04883 345/173 |
| 2011/0007021 A1* | 1/2011 | Bernstein | G06F 3/0416 345/174 |
| 2012/0299851 A1* | 11/2012 | Homma | G06F 3/0488 345/173 |

FOREIGN PATENT DOCUMENTS

| | | |
|---|---|---|
| CN | 101661328 A | 3/2010 |
| CN | 101739166 A | 6/2010 |
| CN | 201616088 U | 10/2010 |
| CN | 102483673 A | 5/2012 |

OTHER PUBLICATIONS

International Search Report and Written Opinion of the International Searching Authority, dated Mar. 20, 2014, pp. 1-10, issued in International Application No. PCT/CN2013/089082, The State Intellectual Property Office, Beijing, The People's Republic of China.

* cited by examiner

*Primary Examiner* — Ariel Balaoing
(74) *Attorney, Agent, or Firm* — Brinks Gilson & Lione

(57) ABSTRACT

Examples of sensing a gesture with respect to a touch input device are described. For example, a method to sense a gesture may include acquiring a distance between a finger, which may not be in contact with the touch input device, and at least two heat sensing spots on the touch input device. The acquired distances may be compared to identify the shortest distance. The gesture of the finger toward the touch input device may be identified based on the shortest distance being less than a predetermined threshold. The described techniques and examples may improve overall performance of system that may be equipped with the touch input device.

7 Claims, 8 Drawing Sheets

METHOD AND APPARATUS FOR SENSING GESTURE TOWARD TOUCH INPUT DEVICE

CROSS REFERENCE TO RELATED APPLICATION

This application is a continuation of PCT/CN2013/089082, filed on Dec. 11, 2013 and entitled "METHOD AND APPARATUS FOR SENSING GESTURE TOWARD TOUCH INPUT DEVICE", which claims the benefit of priority to Chinese Patent Application No. 201310066281.6, entitled "METHOD AND APPARATUS FOR SENSING GESTURE OVER TOUCH INPUT DEVICE", filed on Feb. 28, 2013 with State Intellectual Property Office of PRC, both of which are incorporated herein by reference in entirety.

FIELD OF THE DISCLOSURE

The present application relates to user input devices, and more particularly to a method and apparatus for sensing a gesture toward a touch input device.

BACKGROUND OF THE DISCLOSURE

Smart terminals, for example, smart phones, tablets, and other devices equipped with touch sensitive user inputs, are nowadays, common consumer electronic devices. The consumer electronic devices, such as smart phones and other smart terminals, as compared to conventional cell phones, are typically equipped with a better display device, and further include a user-friendly input device, such as a touch sensitive, or simply a touch input device. For example, a capacitive touch screen is typically used as an input device in smart phones, along with other touch screen technologies.

Generally, in a touch input device, a user may interact with the touch input device using gestures made by fingers. In alternative examples, special user input devices, such as a stylus, may be used to interact with the touch input device. Typically, such user interactions, or gestures, involve identifying a location of the gesture, or the location of the user input device, such as a user's finger during the gesture, on the touch input device. Sensing a location the user input device may include the following steps. For example, in case of a user's finger interacting with an operational surface of a capacitive touch screen, when the finger touches the capacitive screen, a coupling capacitor may be formed between the finger and the operational surface due to the electric field of the human body. The operational surface may be connected to a high-frequency signal. This may cause a small current to be absorbed by the finger, where the current may be flowing from electrodes at four corners of the operational surface. The currents flowing through the four electrodes may be proportional to respective distances from the fingertip to the four corners. The touch screen, using controllers or processors, or other circuitry, for precisely calculating the four current proportions, may derive the location of the gesture.

However, in the touch input device described above, the location, or position information of the user's finger, or any other user input device is sensed when the user's finger touches the touch input device. If the user's finger does not come in contact with the touch input device, even though the user's finger may be in close proximity to the touch input device, the touch input device may not be able to sense the gesture the user is going to perform, such as a click operation on the touch input device.

SUMMARY OF THE DISCLOSURE

A method and apparatus for sensing a gesture towards, or with respect to a touch input device are provided. Several examples are described, which may detect the location of a finger, or any other user input device, which is not in contact with the touch input device.

An example method for sensing a gesture toward a touch input device may include at least the following steps. The method may involve detecting, by each of at least two heat sensors, a heat intensity from a finger at a variable detecting frequency associated with a distance from the finger to the heat sensors. The finger may not be in contact with the touch input device. The method may further involve acquiring a distance from the finger to each of the at least two heat sensors on the touch input device. The distances may be measured based on the heat intensity detected by each of the heat sensors. A shortest distance from among the acquired distances may be identified by comparing the acquired distances with each other. The shortest distance may be larger than 0; that is the finger may not be touching a heat sensor. The gesture of the finger toward the touch input device may be identified in case that the shortest distance is less than a predetermined distance threshold.

An example apparatus for sensing a gesture toward a touch input device may include a distance acquiring module, a comparison module, and a gesture identification module. The distance acquiring module may acquire a distance from a finger to each of at least two heat sensitive spots on the touch input device. The finger may not be in contact with the touch input device. A heat sensitive spot may detect a heat intensity from the finger at a variable detecting frequency corresponding to a distance between the finger and the heat sensitive spot. The distance between the finger and the heat sensitive spot may be acquired based on the heat intensity detected by the heat sensitive spot. The comparison module may compare the distances acquired between the finger and the at least two heat sensitive spots. The comparison module may determine the shortest distance among the acquired distances. The comparison module may further compare the shortest distance with a predetermined distance threshold. The comparison module may ensure that the shortest distance is larger than zero. The gesture identification module may identify the gesture being made toward the touch input device in case the comparison module indicates that the shortest distance is less than the predetermined distance threshold.

In the examples described, the shortest distance among the distances between a finger and heat sensing spots on the touch input device may be identified. The shortest distance may be compared with a preset distance threshold. If the shortest distance is less than the distance threshold, the gesture being performed, or about to be performed by the finger on the touch input device may be identified, prior to and without the finger touching the touch input device.

BRIEF DESCRIPTION OF THE DRAWINGS

The drawings provided are to illustrate examples described in the present application. Other drawings may be obtained by those skilled in the art based on these drawings, and would be within the scope of the present application.

DETAILED DESCRIPTION

The discussion below makes reference to the accompanying drawings which show, by way of illustration, specific examples that may be practiced. Other examples may be utilized and structural changes may be made without departing from the scope of the description of the present document. The described examples are only some of the possible examples of the present disclosure. Based on the examples of the present disclosure, all the other examples obtained by those skilled in the art without any creative work shall fall into the scope of protection of the disclosure.

Figure 1:
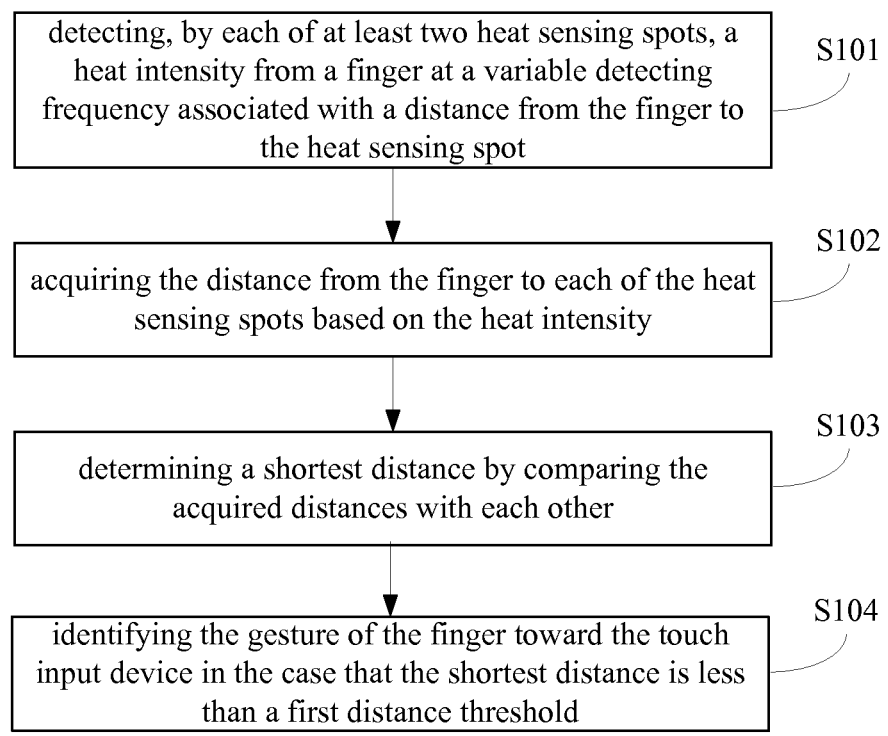
FIG. 1 is a schematic flow chart of an example method for sensing a gesture toward a touch input device.

FIG. 1 is a schematic flow chart of an example method for sensing a gesture toward a touch input device. The method may be used for devices such as smart terminals, for example, smart phones, tablets, and the like. The touch input device may include a capacitive touch screen to interact with the device, such as to provide user input. In the method exemplified in FIG. 1, the term "gesture" refers to a user input gesture, such as a hover gesture. For example, the finger may be over the touch input device within a certain distance from the touch input device, but not in contact with the touch screen of the touch input device. The method exemplified in FIG. 1 includes at least the steps S101-S104 detailed as follows.

S101 may involve detecting, by a heat sensing spot, heat intensity from a finger. The heating spot may perform the detection at a variable frequency, where the frequency for the detection may be determined based on a distance of the finger from the heat sensing spot. The touch input device may be equipped with multiple such heat sensing spots. The heat sensing spots may be heat sensors. The finger may be not in contact with the touch input device.

S102 may involve acquiring the distance of the finger, which is not in contact with the touch input device, from the heat sensing spot on the touch input device. The distance may be acquired based on the heat intensity detected by one or more of the heat sensing spots. The distance between the finger and each of the heat sensing spots may be acquired.

In an example, the heat sensing spots may be deployed uniformly on the capacitive touch screen of the touch input device in a certain density. The heat sensing spots, which may be regarded as heat sensors with small granularities, may be capable of sensing the presence of a finger by perceiving temperature when the finger is at a certain distance from the touch input device. For example, acquiring distance between the finger and a heat sensing spot on the touch input device may involve at least the following steps. A heat intensity sensed by the heat sensing spot from the finger may be acquired. A heat intensity-to-distance ratio may be multiplied by the heat intensity sensed from the finger by the heat sensing spot. The product obtained is the distance from the finger to the heat sensing spot on the touch input device.

Figure 2:
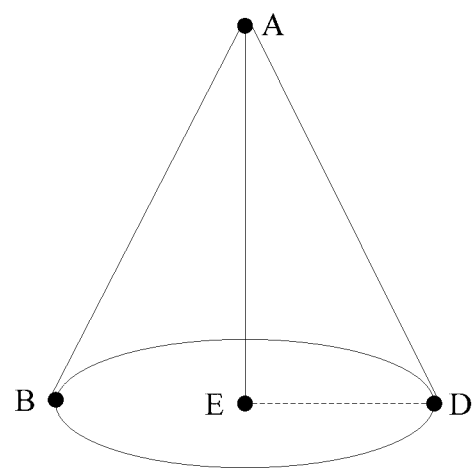
FIG. 2 is a schematic view of example distances measured from a finger to heat sensing spots on a touch input device.

The heat intensity-to-distance ratio refers to a ratio between a heat intensity detected from the finger by the heat sensing spot on the touch input device and the distance between the finger and the heat sensing spot. For a given touch input device, this ratio is a constant. Assume that the heat intensity-to-distance ratio is indicated by 'a'. FIG. 2 is a schematic view of example distances measured from a finger to heat sensing spots on the touch input device. In FIG. 2, heat sensing spots present on the touch input device, are indicated by B, C, and E and the location of the finger is indicated by a spot A. Assuming that the heat intensity detected by the heat sensing spot B from the finger is $P_B$, the heat intensity detected by the heat sensing spot C from the finger is $P_C$, and the heat intensity detected by the heat sensing spot E from the finger is $P_E$, the distance from the finger to the heat sensing spot B on the touch input device is $d_{AB}=a \times P_B$, the distance from the finger to the heat sensing spot C on the touch input device is $d_{AC}=a \times P_C$, and the distance from the finger to the heat sensing spot E on the touch input device is $d_{AE}=a \times P_E$.

In an example, the heat intensity-to-distance ratio may be obtained from information stored in a database. The heat intensity-to-distance ratio may also be acquired, or calculated in real time.

S103 may involve determining a shortest distance among the acquired distances of the finger from the heat sensing spots. The step may involve comparing the acquired distances from each of the heat sensing spots to identify the heat sensing spot closest to the finger.

When a finger approaches the touch screen, the finger together with the sensing spots on the screen form a cone and the apex of the cone may be determined as the location of the gesture. For example, in case of FIG. 2, the distances $d_{AB}$, $d_{AD}$, and $d_{AE}$ may be compared with each other. Assuming that $d_{AE}$ is identified as the shortest among the three distances in this example, the heat sensing spot E may be identified as a geometric center of a base BDE of a cone, as depicted in FIG. 2, encompassing point A, point B, and point D, with point A, i.e., where the finger is located, as apex of the cone.

S104 may involve identifying a gesture that the finger may perform on the touch input device based on the shortest distance being less than a predetermined threshold. In an example, the gesture identification is performed when the identified shortest distance is larger than 0. The shortest distance will be greater than 0 as long as the finger is not in contact with the touch input device.

In an example, the predetermined threshold may be a preset distance value for determining whether the finger is in a 'hover' state over the touch input device. Again, consider the example illustrated in FIG. 2. If the shortest distance $d_{AE}$ among the distances $d_{AB}$, $d_{AC}$, and $d_{AE}$ respectively from the heat sensing spot B, the heat sensing spot C, and the heat sensing spot E, to the finger is within the predetermined threshold, i.e. $d_{AE}$ is less than the predetermined threshold, the finger may be identified to be in the hover state over the touch input device. The system may then respond accordingly. For example, an operation instruction of a button corresponding to the location at which the finger is being hovered, may be shown on the device. For example, the touch input device may be displaying a user-interface that includes several interactive elements, such as buttons, text-boxes and other such user interactive elements. The system may identify that the finger is hovering over one of the user interactive elements, such as a button. Each user interactive element may correspond to a respective operation, such as the button may be programmed to submit information on the user interface, or display additional user interactive elements, or any other operation. In response to identification of the finger hovering over the button, the system may determine that the user may be contemplating of a gesture to press the button. The system may further identify that the user may be trying to understand a result of such interaction prior to completing the gesture. Accordingly, the system may provide the user information describing the user interactive element and/or the operation corresponding to the user interactive element. The information may be provided via a pop-up, or any other user-interface medium. The user may then determine whether to proceed with the operation or not, and complete the gesture of clicking the user interactive element, such as the button.

Alternatively, or in addition, the device may perform pretreatment of the operation associated with a screen location corresponding to the location at which the finger is being hovered. The pretreatment may be performed in advance to the finger touching the touch screen, and thus prior to completion of the gesture. For instance, in the above example involving the button to submit information, the system may initiate collection of the data from the user interface screen that is to be submitted on completion of the gesture, i.e. pressing of the button, prior to completion of the gesture to press the button. Various other operations may be performed by the device in response to identification of the gesture.

To minimize power consumption, the heat sensing spots on the touch input device may not actively sense the heat intensity all the time. For example, if the finger is too far away from the touch input device, the heat intensity may not be sensed. In an example, the frequency at which the heat sensing spot detects the heat intensity may be adjusted based on an initial distance measurement. For example, the distance from the finger to the touch input device may be compared to a second distance threshold. The second distance threshold may be same or different than the predetermined threshold used to identify the gesture. If the distance from the finger to the touch input device is less than the second distance threshold, the variable detecting frequency at which the heat sensing spot detects the heat intensity may be increased. Alternatively, if the distance from the finger to the touch input device is greater than the second distance threshold, then the frequency at which the heat sensing spot detects the heat intensity may be decreased, i.e. the heat sensing may be performed after longer durations of time, thereby saving power. In an example, each of the various heat sensing spots may operate at a different heat detection frequency.

Thus, in an example method, after identifying the shortest distance among the distances from the finger to the heat sensing spots on the touch input device, the shortest distance may be compared with the preset first distance threshold. If the shortest distance is within the first distance threshold, such as less than or equal to the first distance threshold, the finger is identified to be hovering over the touch input device. A location of the finger with respect to the touch screen may be identified. Based on, the finger being hovered over the touch input device at the identified location, the device may take responsive steps to improve overall performance of the system. For example, the operation instruction of the button on the touch input device may pop-up without touching the button with by the finger. Alternatively, the system may perform pretreatment in advance when the system detects that the finger hovers over the button to click, thus increasing the overall performance of the system and enhancing user experience.

Figure 3:
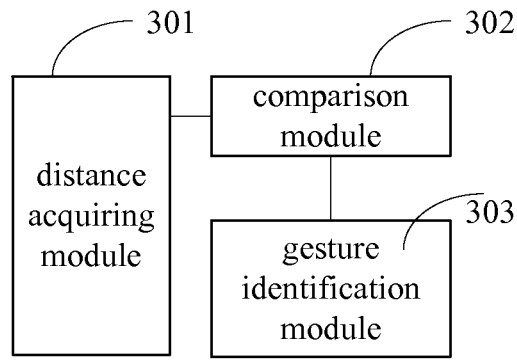
FIG. 3 is a schematic structural view of an example apparatus for sensing a gesture toward a touch input device.

FIG. 3 is a schematic structural view of an example apparatus for sensing a gesture toward a touch input device. The apparatus, as shown in FIG. 3, may be a functional module/unit of a device, such as a smart terminal, enabled for touch interactions via the touch input device. The apparatus may include a distance acquiring module 301, a comparison module 302, and a gesture identification module 303. Each module may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of memory, for example, that comprises instructions executable with a processor to implement one or more of the features of the module. The instructions may be executable with a processor that may or may not be part of the module. In some examples, each module may just be the portion of the memory that comprises instructions executable with a processor. In other examples, the apparatus may include other components not illustrated in FIG. 3.

The distance acquiring module 301 may acquire a distance from a finger to each of multiple heat sensing spots on the touch input device, where the finger is not in contact with the touch input device. Each of the heat sensing spots may detect a heat intensity from the finger at a variable detecting frequency. The heat detection frequency may be varied according to distance of the finger from the heat sensing spots. The distance of the finger from each of the heat sensing spots may be measured based on the heat intensity detected by the heat sensing spots.

The comparison module 302 may compare the acquired distances determine the shortest distance in the acquired distances. The comparison module 302 may further compare the shortest distance with one or more distance thresholds.

The gesture identification module 303 may identify the gesture being performed or about to be performed by the finger on the touch input device. The gesture identification module 303 may identify the gesture in response to the comparison module 302 indicating that the shortest distance is less than a predetermined distance threshold.

The division of various functional modules is illustrative, and in other examples, the features of the modules may be distributed to other modules, such as to comply with hardware and/or software implementation constraints, or for convenience of hardware and/or software implementation. In other words, different example apparatus for sensing a gesture toward the touch input device may be divided into different modules for implementing the features described in the present disclosure. Also, the modules may be implemented by corresponding hardware, or may be implemented by corresponding software executed on corresponding hardware. For example, the distance acquiring module may be hardware which is operable to acquire the distance of the finger to the heat sensing spots on the touch input device, such as a distance acquirer, or may be a processor or other hardware device for executing corresponding computer programs to achieve the acquisition. In another example, the comparison module may be hardware, which is operable to compare the acquired distances, such as a first comparator, or may be a processor or other hardware device for executing corresponding computer programs to achieve the comparison.

Figure 4:
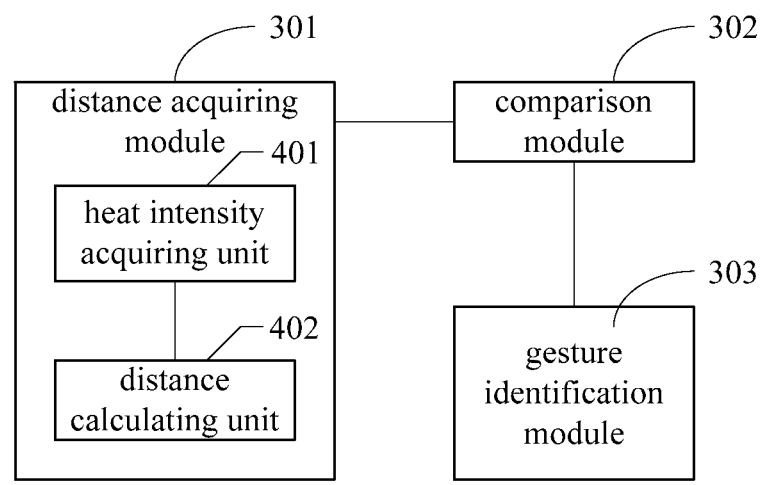
FIG. 4 is a schematic structural view of an example apparatus for sensing a gesture toward a touch input device.

FIG. 4 is a schematic structural view of an example apparatus for sensing a gesture toward a touch input device. The distance acquiring module 301 illustrated in FIG. 3 may include a heat intensity acquiring unit 401 and a distance calculating unit 402, as shown in FIG. 4.

The heat intensity acquiring unit 401 may acquire a heat intensity from the finger sensed by the heat sensing spots.

The distance calculating unit 402 may calculate the distance between the finger and each of the heat sensing spots on the touch input device. The calculating unit 402 may multiply a heat intensity-to-distance ratio by the heat intensity from the finger sensed by a heat sensing spot.

Figure 5A:
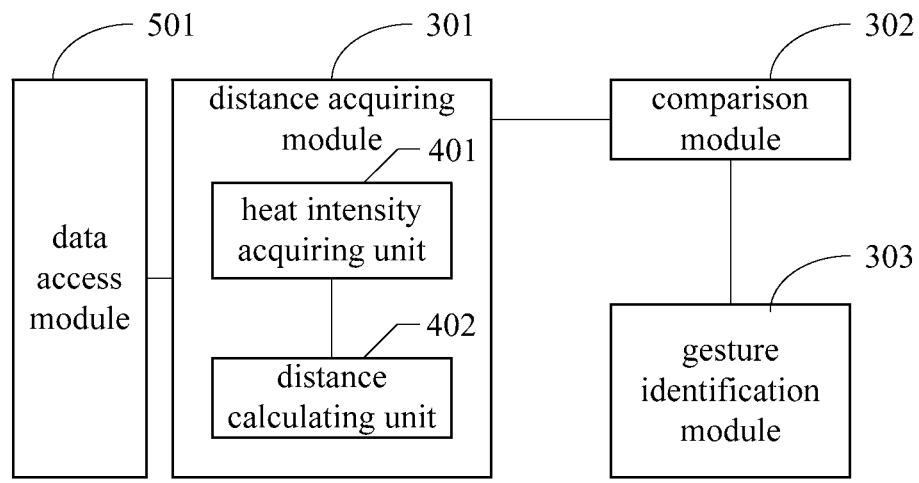
FIG. 5a is a schematic structural view of an example apparatus for sensing a gesture toward a touch input device.
Figure 5B:
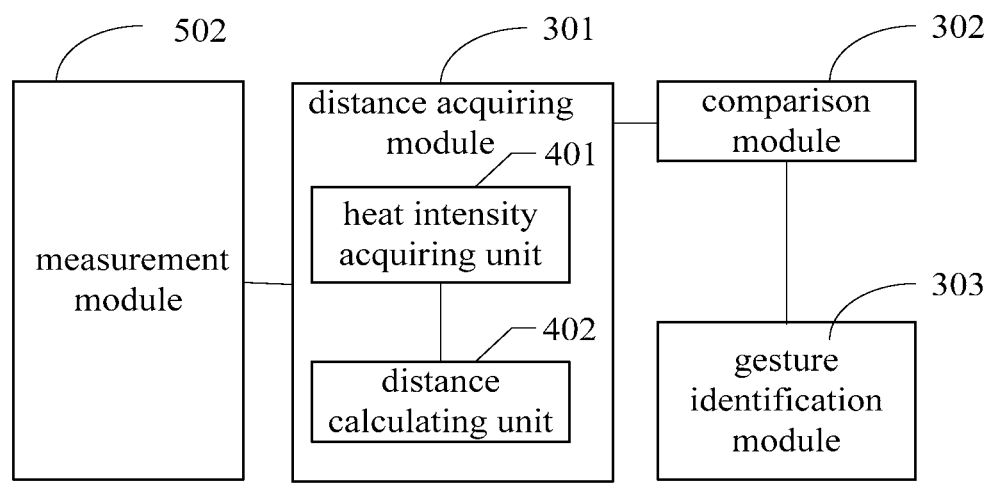
FIG. 5b is a schematic structural view of an example apparatus for sensing a gesture toward a touch input device.
Figure 6A:
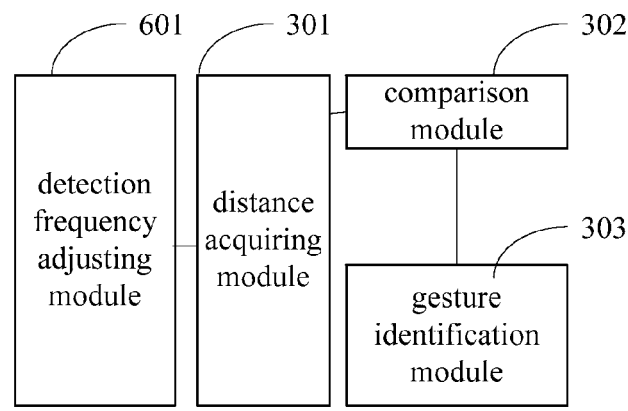
FIG. 6a is a schematic structural view of an example apparatus for sensing a gesture toward a touch input device.
Figure 6B:
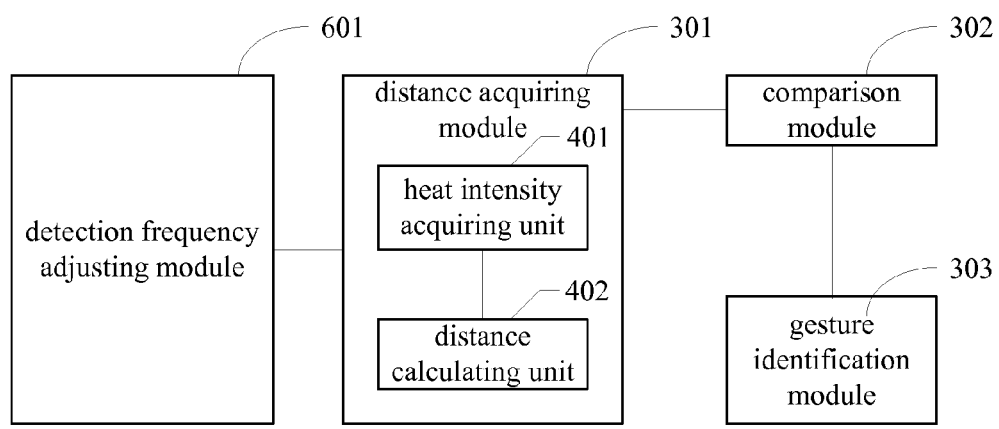
FIG. 6b is a schematic structural view of an example apparatus for sensing a gesture toward a touch input device.
Figure 6C:
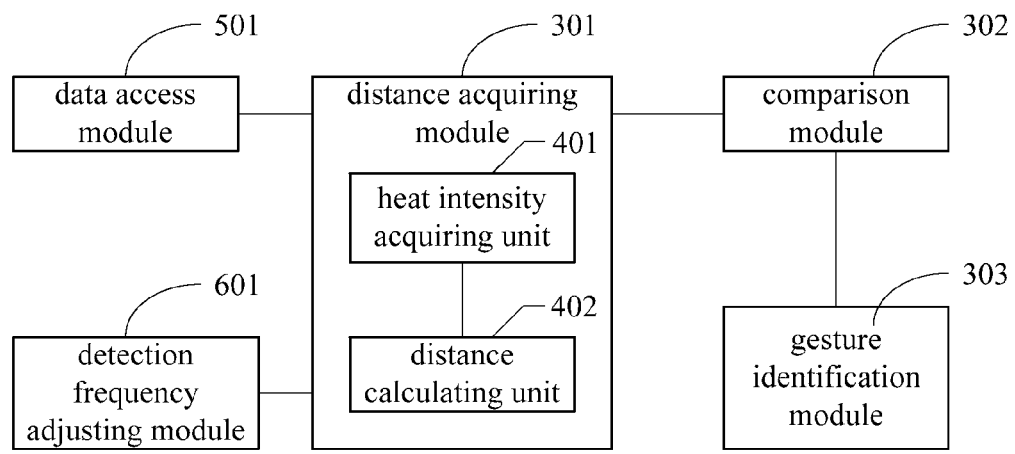
FIG. 6c is a schematic structural view of an example apparatus for sensing a gesture toward a touch input device.
Figure 6D:
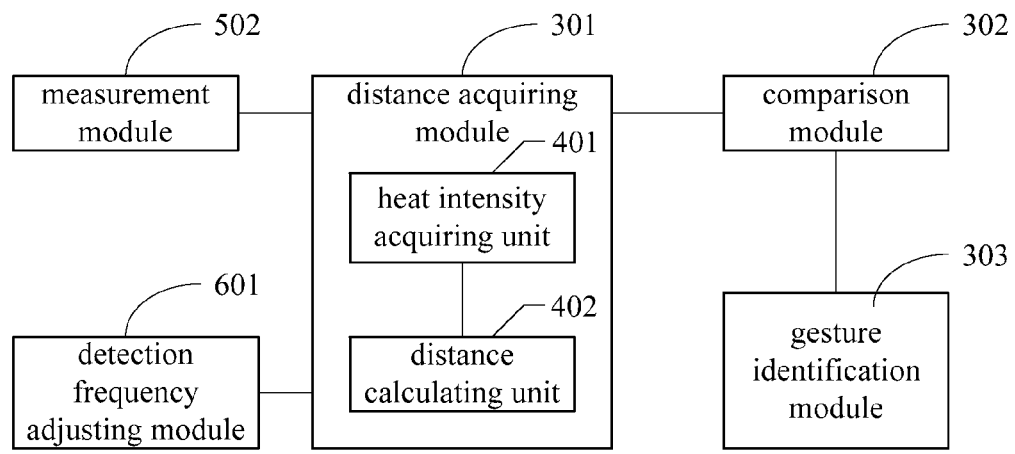
FIG. 6d is a schematic structural view of an example apparatus for sensing a gesture toward a touch input device.
Figure 7A:
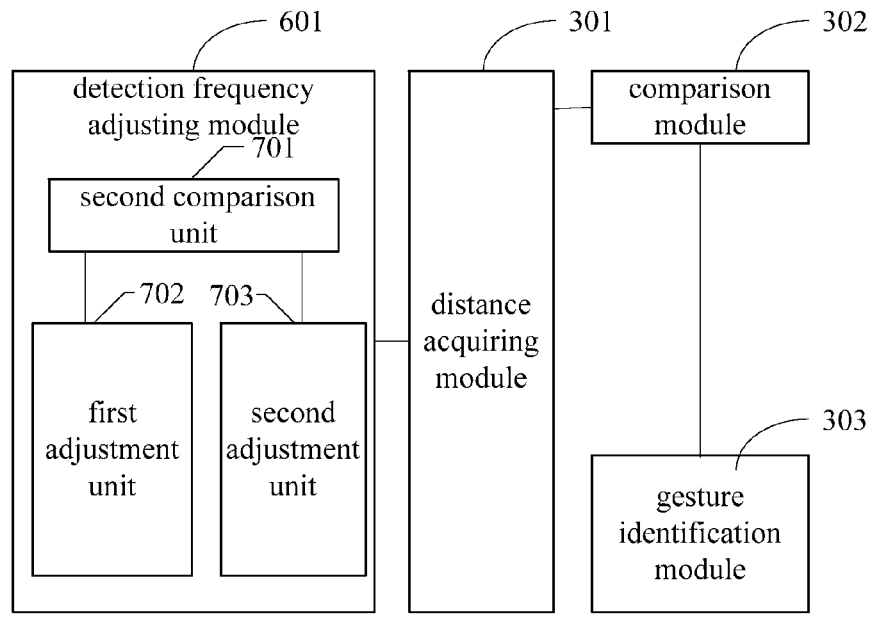
FIG. 7a is a schematic structural view of an example apparatus for sensing a gesture toward a touch input device.
Figure 7B:
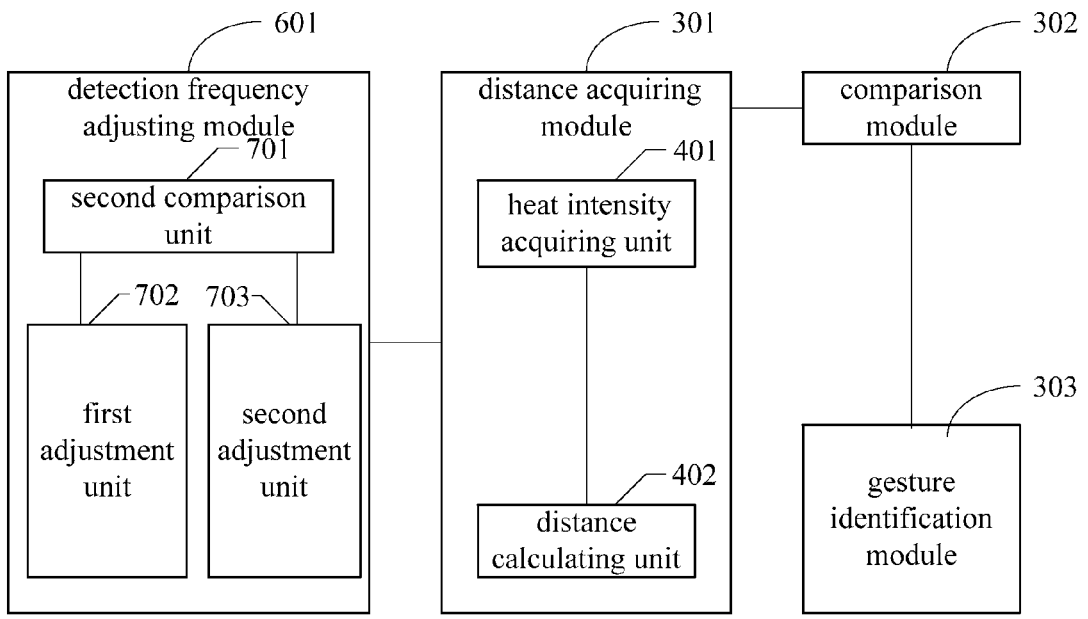
FIG. 7b is a schematic structural view of an example apparatus for sensing a gesture toward a touch input device.
Figure 7C:
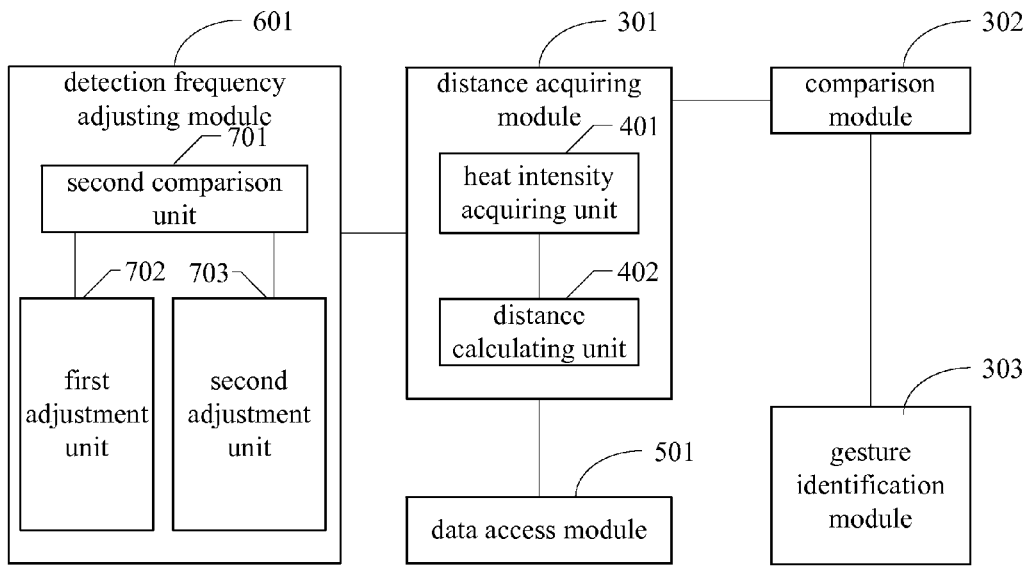
FIG. 7c is a schematic structural view of an example apparatus for sensing a gesture toward a touch input device.
Figure 7D:
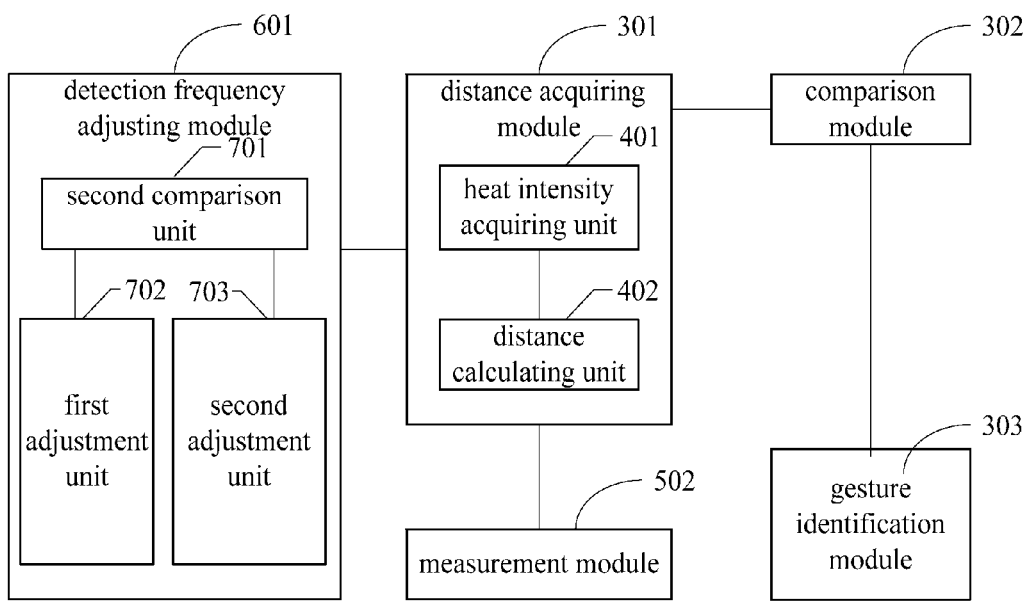
FIG. 7d is a schematic structural view of an example apparatus for sensing a gesture toward a touch input device.

FIGS. 5a and 5b illustrate schematic structural views of example apparatus for sensing a gesture. The apparatus, in addition to the components illustrated, in FIG. 4 may further include a data access module 501 and/or a measurement module 502.

The data access module 501 may obtain, or access, the stored heat intensity-to-distance ratio from a memory location, such as from a database, or preconfigured memory location.

The measurement module 502 may measure the heat intensity-to-distance ratio in real time.

FIGS. 6a to 6d illustrate schematic structural views of example apparatus for sensing a gesture. The apparatus for sensing a gesture may include a detection frequency adjusting module 601. The detection frequency adjusting module 601 may adjust the frequency at which a heat sensing spot detects the heat intensity from the finger to acquire, or measure the distance of the finger from the heat sensing spots on the touch input device.

FIGS. 7a to 7d illustrate schematic structural views of example apparatus for sensing a gesture. As illustrated in FIGS. 7a to 7d, the detection frequency adjusting module 601 may include a second comparison unit 701, a first adjustment unit 702, and a second adjustment unit 703.

The second comparison unit 701 may compare the distance from the finger to the touch input device with a second distance threshold. The second distance threshold may be a separate threshold than the predetermined distance threshold used by the comparison module 302 to identify the gesture. Instead, the second distance threshold, and comparison of the distance of the finger from the touch input device, may be used to adjust the frequency at which the heat intensity from the finger is measured, or acquired by the heat sensing spots.

For example, the first adjustment unit 702 may increase the frequency at which the heat sensing spot detects the heat intensity. The first adjustment unit 702 may, for example, operate in response to the distance from the finger to the touch input device being less than, or equal to the second distance threshold.

The second adjustment unit 703 may decrease the frequency at which the heat sensing spot detects the heat intensity. The second adjustment unit 703 may operate, for example, in response to the distance from the finger to the touch input device being greater than the second distance threshold. By adjusting the frequency at which the heat intensity is detected by the heat sensing spots, the heat sensing spots may actively detect the heat intensity for shorter periods of time. Thus, the detection frequency adjusting unit may conserve power consumed by the apparatus.

It is to be noted that the various modules/units of the apparatus exchange information among themselves, so that the apparatus may perform operations and or steps to identify the gesture being performed, or about to be performed by the finger that may be hovering on the touch input device.

It can be understood by the skilled in the art that, all or some of the steps to identify the gesture may include instructing hardware with computer executable instructions, such as via a computer program.

Further, it can be understood by those skilled in the art that such a computer program may be stored in a computer readable storage medium. The computer readable storage medium may be a magnetic disk, an optical disk, a Read-Only Memory (ROM), a Random Access Memory (RAM), and the like.

It can be understood by those skilled in the art that the method and apparatus for sensing a gesture toward a touch input device may be implemented by processing units including CPU (central processing unit) or general computing device and storage units including RAM or ROM for storing programs.

Exemplary methods and apparatus for sensing a gesture toward a touch input are described in detail in the above. Specific examples are used herein to set forth the principle and techniques involved, and the above description of the examples of the present application. Furthermore, those skilled in the art may modify the specific examples and the application thereof based on the description in the present application. In summary, the specification should not be understood as a limitation to the present application. Any modification or equivalent replacement made by those skilled in the art within the technical scope disclosed in the examples of the disclosure should fall within the scope of protection of the disclosure. Therefore, the scope of protection of the disclosure should be based on the scope of protection of claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method for sensing a gesture towards a touch input device, the method comprising:
   detecting, by each of a plurality of heat sensing spots on the touch input device, a heat intensity from a finger, wherein the finger is not in contact with the touch input device, and the heat intensity is detected at a variable frequency by a heat sensing spot of the plurality of heat sensing spots, wherein the variable frequency for the detecting is associated with a distance of the finger from the heat sensing spot;
   calculating, by a processor, a distance of the finger from each of the plurality of heat sensing spots, based on the heat intensity detected by each of the heat sensing spots;
   determining, by the processor, a shortest distance among the calculated distances by comparing the calculated distances;
   identifying, by the processor, the gesture of the finger toward the touch input device, in response to the shortest distance being less than a predetermined distance threshold,
   comparing, by the processor, a first distance of the finger from a first heat sensing spot with a second distance threshold;
   increasing, by the processor, the variable frequency of the first heat sensing spot in response to the distance of the finger from the first heat sensing spot being less than the second distance threshold; and
   decreasing, by the processor, the variable frequency of the first heat sensing spot in response to the distance of the finger from the first heat sensing spot being greater than the second distance threshold.

2. The method according to claim 1, wherein calculating the distance of the finger from each of the heat sensing spots on the touch input device is based on
   a heat intensity-to-distance ratio, and the heat intensity sensed by each of the heat sensing spots.

3. The method according to claim 2, further comprising:
   obtaining, by the processor, the heat intensity-to-distance ratio from a computer readable storage device; or
   measuring, by the processor, the heat intensity-to-distance ratio in real time.

4. An apparatus for sensing an intended gesture toward a touch input device, the apparatus comprising:
   a storage having codes stored therein; and
   one or more processors, when executing the codes, configured to:
      acquire a distance of a finger from each of a plurality of heat sensing spots on the touch input device, wherein the finger is not in contact with the touch input device, each of the heat sensing spots is configured to detect, at a variable frequency, a heat intensity from the finger, wherein the variable frequency for the detecting is associated with a distance from the finger to the each heat sensing spot, and the distance of the finger from the each of the heat sensing spots is acquired based on the heat intensity detected by the each of the heat sensing spots;
      compare the acquired distances to determine a non-zero shortest distance among the acquired distances, and to compare the shortest distance with a predetermined distance threshold;
      identify the intended gesture of the finger toward the touch input device, in response to the shortest distance being less than the predetermined distance threshold,
      compare a second distance threshold and the distance of the finger from a first heat sensing spot;
      increase the variable heat detection frequency of the first heat sensing spot in response to the distance of the finger from the first heat sensing spot being less than the second distance threshold; and
      decrease the variable heat detection frequency of the first heat sensing spot in response to the distance of the finger from the first heat sensing spot being greater than the second distance threshold.

5. The apparatus according to claim 4, wherein the one or more processor, when executing the codes, is further configure to:
   acquire the heat intensity sensed by the each of the heat sensing spots from the finger; and
   calculate the distance of the finger from the each of the heat sensing spots on the touch input device by multiplying a heat intensity-to-distance ratio by the heat intensity sensed by the each of the heat sensing spots.

6. The apparatus according to claim 5, wherein the one or more processor, when executing the codes, is further configure to:
   obtain the heat intensity-to-distance ratio of the each of the heat sensing spots from a memory device; or
   measure the heat intensity-to-distance ratio of the each of the heat sensing spots in real time.

7. A non-volatile computer readable storage medium containing computer executable instructions, wherein the executable instructions, when executed by a computer, instruct the computer to perform steps comprising:
   detecting, by each of at least two heat sensing spots of a touch sensitive device, a heat intensity from a finger, the heat sensing spots operable to detect the heat intensity at a variable detecting frequency associated with a distance of the heat sensing spot from the finger, wherein the finger is not in contact with the touch sensitive device;
   acquiring a distance of the finger from each of the at least two heat sensing spots of the touch sensitive device, based on the heat intensity detected by each of the heat sensing spots;
   determining a non-zero shortest distance among the acquired distances by comparing the acquired distances;
   identifying a gesture of the finger toward the touch sensitive device, in response to the shortest distance being less than a predetermined distance threshold,
   comparing a first distance of the finger from a first heat sensing spot with a second distance threshold;

increasing the variable frequency of the first heat sensing spot in response to the distance of the finger from the first heat sensing spot being less than the second distance threshold; and decreasing the variable frequency of the first heat sensing spot in response to the distance of the finger from the first heat sensing spot being greater than the second distance threshold.

* * * * *